Jan. 17, 1961 R. C. ALLEN 2,968,600
CONTROL FOR A BOILING TYPE REACTOR SUPPLYING A STEAM TURBINE
Filed March 11, 1955
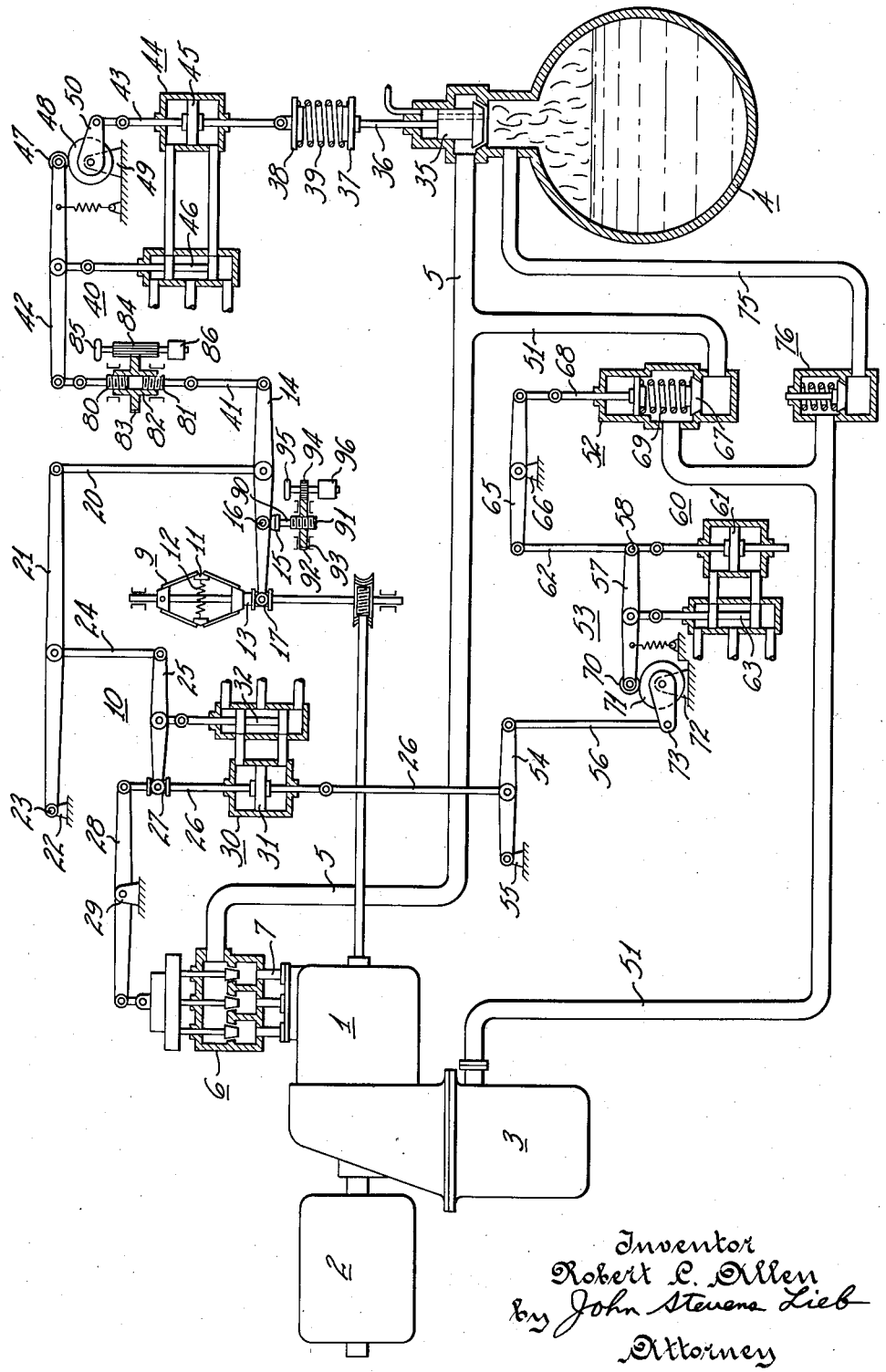
Inventor
Robert C. Allen
by John Stevens Lieb
Attorney

ABOVE

United States Patent Office 2,968,600
Patented Jan. 17, 1961

2,968,600

CONTROL FOR A BOILING TYPE REACTOR SUPPLYING A STEAM TURBINE

Robert C. Allen, Wauwatosa, Wis., assignor to Allis-Chalmers Manufacturing Company, Milwaukee, Wis.

Filed Mar. 11, 1955, Ser. No. 493,783

10 Claims. (Cl. 204—193.2)

This invention relates generally to a power plant including a steam turbine supplying power to a variable load at substantially constant speed and a steam generator of the boiling reactor type for supplying steam to the turbine. Specifically this invention relates to improved means for controlling the operation of the plant.

In a power plant having a steam generator and a steam turbine supplying power to operate various types of mechanical equipment or an electric generator which in turn supplies power to an electrical network, it is desirable to control the operation of both the turbine and the steam generator to obtain efficient utilization of the fuel used to supply energy to operate the plant. In the case of a steam generator of the boiling reactor type, the operating characteristics of the reactor may be such that the heat output can be controlled by controlling the steam pressure in the reactor assembly. That is, the heat output can be increased by increasing the pressure in the reactor assembly and the heat output can be decreased by decreasing the pressure in the reactor assembly. Such variation in heat output takes place because increasing the pressure in a reactor decreases the size of bubbles in the boiling water and the smaller the bubbles the greater the moderating effect of the water and the greater the heat output of the reactor and vice versa, decreasing the pressure in the reactor increases the size of bubbles in the boiling water and the larger the bubbles the less the moderating effect of the water and the less will be the output of the reactor.

The present invention proposes to provide a valve assembly for controlling the admission of steam to the turbine, with the operation of the valve assembly responsive to changes in turbine speed so as to restore turbine speed substantially to a predetermined value upon changes in turbine speed at a constant or variable load, and to also provide means comprising a spring loaded valve for controlling steam pressure within the boiling reactor assembly. A control is included for regulating compression of the spring, responsive to changes in turbine speed, so as to match the heat output of the boiling reactor to the heat requirements of the turbine for any particular load on the turbine.

It is therefore an object of this invention to provide a power plant having a steam turbine and a steam generator of certain boiling reactor types with improved means for controlling the admission of steam to the turbine and the heat output of the boiling reactor, such means having various parts constructed and arranged in a novel manner to continuously and automatically control the heat input to the turbine to maintain turbine speed at a substantially constant predetermined value despite changes in load on the turbine and to automatically and continuously match the heat output of the boiling reactor to the heat input to the turbine.

Another object of this invention is to provide the various parts constructed and arranged in a novel manner to provide a first adjusting means controlling heat output of the boiling reactor to correct any mismatching of reactor heat output to turbine requirements.

Another object of this invention is to provide various parts constructed and arranged in a novel manner to provide a second adjusting means to simultaneously adjust means controlling both the heat output of the boiling reactor and heat input to the turbine regardless of the load on the turbine.

Objects and advantages other than those above set forth will be apparent as the description of the invention proceeds.

The novel features of the invention and how the objects are attained will appear from the specification and the accompanying drawing showing schematically one embodiment of the invention and forming a part of this application, and all of these novel features are intended to be pointed out in the claims.

Referring to the drawing, a steam turbine 1 is shown for producing mechanical power which may be converted to electrical energy by a generator 2 connected to the turbine. A condenser 3 is attached to the casing of turbine 1 to receive and collect steam which has passed through the turbine and condense such steam into water. A boiling type reactor 4 is provided to supply steam for operating turbine 1. Means are provided for delivering steam produced by reactor 4 to turbine 1 comprising a conduit 5 and a valve assembly 6, the valve assembly 6 being connected to the turbine by several conduits 7.

A governor 9 responsive to the speed of turbine 1 is connected to valve assembly 6 through a first linkage 10, for controlling the admission of steam to turbine 1 in a manner and for a purpose that will appear as the description of this invention proceeds. The governor 9 may be of the well known type having a pair of flyballs 11 shown held together by a spring 12 to lower a sleeve 13 and movable outwardly under the influence of centrifugal force to raise sleeve 13. This first linkage 10 comprises a lever 14 pivotally attached intermediate its end portions to a bracket 15 by a pin 16. One end of lever 14 is connected to governor 9 by a sliding collar 17 and lever 14 is connected at a mid point to one end of a lever 21 by a link 20. The end of lever 21 remote from link 20 is attached to a bracket 22 by a pin 23. One end of a link 24 is connected to lever 21 intermediate its end portions and the other end of link 24 is connected to one end of a lever 25. The end of lever 25 remote from link 24 is connected to a rod 26 by a sliding collar 27. Rod 26 is connected to one end of a lever 28. Lever 28 is supported by a bracket 29 intermediate its end portions. The end of lever 28 remote from rod 26 is connected to valve assembly 6. As shown, when lever 28 is rotated clockwise about bracket 29 valve assembly 6 will be operated in an opening direction to admit steam from conduit 5 to turbine 1 and vice versa when lever 28 is rotated counterclockwise about bracket 29 valve assembly 6 will be operated in a closing direction to shut off the flow of steam from conduit 5 to turbine 1. Considerable force may be required to adjust valve assembly 6. For this reason a first fluid pressure operated servomotor 30, of a well known type, is provided to supply force necessary to operate valve assembly 6. The servomotor 30 comprises a power piston 31 connected to rod 26. A pilot valve 32 which is connected to lever 25 controls admission of fluid pressure to one or the other of the sides of the power piston 31 to move rod 26.

As much of the power plant that has thus far been described operates in the following manner. Assuming that reactor 4 is generating steam which is being delivered through conduit 5 and valve assembly 6 to turbine 1, and that the turbine is running under load, an increased load upon the turbine will cause the turbine to slow down. As the turbine speed decreases the governor 9 also slows down and centrifugal force acting upon flyballs 11 will be reduced and spring 12 will pull flyballs 11 together and move sleeve 13 downwardly. The downward motion of sleeve 13 will rotate lever 14 counterclockwise about pin 16. The counterclockwise rotation of lever 14 about pin 16 will raise link 20 and rotate lever 21 counterclockwise around pin 23. The counterclockwise rotation of lever 21 raises link 24 and rotates lever 25 counterclockwise around the sliding collar 27. Counterclockwise rotation of lever 25 lifts pilot valve 32 to admit fluid pressure to the top surface of power piston 31 and move rod 26 down. The downward movement of rod 26 will rotate lever 28 clockwise around bracket 29 and thereby adjust valve assembly 6 in an opening direction to admit additional steam to the turbine and bring the turbine speed back up to the predetermined speed and simultaneously restore pilot valve 32 to its original position. If on the other hand the load on turbine 1 is decreased, the turbine will run faster and governor 9 will also turn more rapidly and increased centrifugal force acting upon the flyballs 11 will force flyballs 11 outwardly against the bias of spring 12 and lever 14 will be rotated clockwise around pin 16. This will cause link 20 to be lowered and lever 21 to be rotated clockwise around pin 23. Further, link 24 will then be lowered and pilot valve 32 will be lowered by lever 25 to admit oil to the under side of power piston 31. Power piston 31 will then raise rod 26 and rotate lever 28 counterclockwise around bracket 29 and adjust valve assembly 6 to reduce the flow of steam to turbine 1 and reduce the speed of turbine 1 to the predetermined value and simultaneously restore pilot valve 32 to its original position.

Valve means is provided to control the pressure within the reactor 4 and thereby control the heat output of the reactor. The valve means includes a valve 35 positioned within a steam outlet passage of the reactor leading to conduit 5 for the purpose of regulating the steam pressure within the reactor 4. A stem 36 is attached to the valve 35 and the stem extends through the cover on the valve body mounted on reactor 4. Also extending through the cover is a right angular shaped nozzle 35b. The nozzle is maintained closed. However, when necessary, it is opened and employed to purge the back surface of valve 35. The end of stem 36 protruding from the reactor 4 is connected to a first disk member 37. The disk member 37 is connected to a second disk member 38 by a spring 39. The second disk member 38 is connected to the governor 9 through a second linkage 40. The second linkage includes lever 14 which also forms a part of the first linkage connecting the governor 9 to the valve assembly 6. Lever 14 is however also connected to a link 41 which in turn is connected to one end of a lever 42. The end of lever 42 remote from link 41 is arranged to be moved, through a cam, from rod 43. Rod 43 is connected to the second disk member 38. The second linkage 40 therefore connects the governor 9 to the second disk member 38. A fluid pressure operated servomotor 44 may also be included in the second linkage 40, in the same manner servomotor 30 is included in the first linkage 10, to provide the power for compressing spring 39 and opposing the force exerted in an upwardly direction by the steam pressure in the reactor 4 acting upon valve 35. The servomotor 44 comprises a power piston 45 connected to rod 43 and a pilot valve 46 connected to lever 42 at a point intermediate its end portions. Pilot valve 46 controls admission of fluid pressure to one or the other of the sides of power piston 45 to move rod 43. The connection between lever 42 and rod 43 may be by a roller 47 in contact with a cam 48. The cam 48 may be supported by a bracket 49. A lever 50 secured to cam 48 to rotate with the cam about the cam's rotating axis, is connected to rod 43. The rate at which movement of rod 43 is relayed back to lever 42 may therefore be different for various positions of disk member 38. When the speed of turbine 1 increases as a result of reduced load the clockwise rotation of lever 14 in addition to causing the valve assembly 6 to reduce the flow of steam to the turbine also lowers link 41. The lowering of link 41 rotates lever 42 counterclockwise about roller 47 and thereby lowers pilot valve 46 to admit fluid pressure below power piston 45. Power piston 45 then moves rod 43 and disk member 38 upwardly reducing the compression of spring 39 and decreasing the force acting on the top of the first disk member 37. Pressure within the reactor 4 will therefore decrease and the heat output of reactor 4 will be reduced to match the decreased demands of the turbine. If on the other hand the load on turbine 1 were to be increased governor 9 would rotate lever 14 counterclockwise and adjust the first linkage 10 to in turn adjust valve assembly 6 to increase the flow of steam into turbine 1 and raise the speed of the turbine back up to the predetermined value. Counterclockwise rotation of lever 14 about pin 16 will also raise link 41 which will in turn rotate lever 42 clockwise about roller 47. The clockwise rotation of lever 42 about roller 47 will raise pilot valve 46 to admit fluid pressure to the top side of power piston 45. This will cause a downward movement of rod 43 which will increase the compression of spring 39 and increase the force on the first disk member 37 to move the valve 35 in a closing direction and thereby increase the pressure within the reactor and increase the heat output thereof. Movement of rod 43 in either direction is transmitted through cam 48 and roller 47 to lever 42 to restore pilot valve 46 to its normal position.

When the valve assembly 6 is adjusted to reduce the flow of steam to turbine 1 and the valve 35 has been correspondingly positioned to decrease the pressure in the reactor and the heat output of the reactor, the valve assembly 6 may undesirably act to control the pressure within the reactor 4 by causing pressure to build up in conduit 5 that would create a pressure in the reactor 4 sufficient to increase the heat output of the reactor in spite of the fact that valve 35 had been raised to decrease the heat output of the reactor. To prevent steam pressure in conduit 5 building up and increasing the pressure within the reactor 4 a second conduit 51 is connected to one end to the first conduit 5 and the other end to condenser 3 to bypass steam around the valve assembly 6 and turbine 1 and discharge steam directly to the condenser. A valve assembly 52 is provided to control the flow through the conduit 51. Valve assembly 52 is responsive to the action of the speed governor 9 and the first linkage 10 controlling the valve assembly 6, in that valve assembly 52 is operated by a third linkage 53 connected to the first linkage 10 to open valve 52 and permit steam to be discharged directly to the condenser upon closing of the valve assembly 6. To operate the valve 52 a lever 54 is pivotally connected to a bracket 55. Rod 26 of the first linkage 10 is connected to lever 54 intermediate its end portions. A link 56 is connected to lever 54 on the end remote from bracket 55. Link 56 transmits motion through a cam to one end of a lever 57. The lever 57 operates a fluid pressure operated servomotor 60 which utilizes fluid pressure to provide the force necessary to adjust control valve 52. The servomotor 60 has a power piston 61 that is connected to a rod 62. A pilot valve 63 is provided to control the fluid pressure acting upon the power piston 61. The lever 57 is connected on the end remote from link 56 to the rod 62 by a pin 58. The pilot valve 63 is connected to the lever 57 at a point intermediate the end portions thereof. The rod 62 is connected to one end of a lever 65. The lever 65 is pivotally supported by a bracket 66. The end of lever 65 remote from rod 62 is connected to the valve assembly 52. Valve 52 includes a valve 67 and a valve stem 68. The valve stem is not directly connected to the valve body 67 but rather a spring 69 connects the two elements so that valve 67 may be responsive to a predetermined pressure in the conduits 51 and 5 as well as responsive to the operation of the third linkage 53. The connection between link 56 and lever 57 may be made by a roller 70 engaging a cam 71. The cam 71 may be supported by a bracket 72. A lever 73 secured to rotate with cam 71 about the cam's rotational axis, is connected to link 56. The amount of movement link 56 imparts to lever 57 and the rate at which pilot valve 63 is restored to a neutral position may be made different for various positions of rod 56 and the pressure at which valve 52 may open can be made to vary in amount and rate for various power outputs.

The third linkage 53 acts to operate the valve assembly 52 to prevent pressure in conduit 5 exerting an abnormal back pressure on reactor 4 in the following manner. When the load on turbine 1 is reduced and governor 9 adjusts the first linkage 10 to reduce the flow of steam to the turbine and the governor also adjusts the second linkage 40 to position the valve 35 so as to reduce pressure within the reactor 4 the third linkage 53 will be adjusted to reduce the spring loading on valve 52 and thus permit it to open to discharge steam from conduit 5 through conduit 51 to the condenser 3 if the pressure exceeds a predetermined limit. When the servomotor 30 raises rod 26 to adjust the valve assembly 6 and reduce the admission of steam to the turbine the upward movement of rod 26 will also rotate the lever 54 counterclockwise about the bracket 55. The counterclockwise rotation of lever 54 lifts link 56 and rotates lever 57 clockwise around the pin 58. The clockwise rotation of lever 57 raises the pilot valve 63 of the servomotor 60 and fluid pressure is admitted to the top side of power piston 61 to move power piston 61 and rod 62 downwardly. The downward movement of rod 62 will rotate lever 65 counterclockwise around the bracket 66 and raise the stem 68 and reduce the compression on spring 69 so that the pressure in conduits 5 and 51 may reduce the spring loading on valve 67 and permit discharge of steam to the condenser 3 if the pressure exceeds the predetermined limit.

To provide further safeguard against possible dangerous pressures in the reactor 4 a discharge line 75 connects the interior of the reactor 4 with the conduit 51 downstream of the valve assembly 52. The conduit 75 is provided with a safety valve 76 which may open when the pressure within the reactor 4 exceeds a predetermined maximum and if such event occurs the opening of valve 76 will also discharge steam from the reactor directly to the condenser 3.

The apparatus so far described provides means for continuously and automatically controlling the heat output of the reactor 4 to equal the heat requirements of turbine 1. It may be desirable however to have additional means for adjusting the operation of the reactor 4 to provide a fine control that can eliminate any mismatching of reactor heat output to turbine requirements to obtain the best possible adjustment of the system for the most economical operation. A first adjusting means is therefore provided to adjust the second linkage 40 to vary the action of the linkage 40 in response to action of the governor 9. The first adjusting means adjusts the second linkage by varying the effective length of link 41. Link 41 may be made in two parts having adjacent end portions 80 and 81 threaded in opposite directions and turned within a threaded hub portion 82 of a gear 83. The gear 83 engages a gear 84. As shown, the gear 84 is mounted so that it may rotate but may not move axially. Gear 83 on the other hand may rotate and move axially. Gear 84 has sufficient axial length so that axial movement of gear 83 will not cause these two gears to disengage. Gear 84 may be turned by means of a hand wheel 85 or by means of an electric motor 86 which may be remotely controlled. To vary the length of link 41 the gear 84 is rotated either by hand wheel 85 or by motor 86. The rotation of gear 84 will rotate gear 83 and end portions 80 and 81 within the hub 82 of gear 83 will move either toward or away from each other depending on the direction of rotation of gear 83. Lengthening or shortening link 41 will increase or decrease respectively any particular adjustment of the second linkage 40 in response to the speed governor 9. Any mismatching of the heat output of reactor 4 to the heat requirements of turbine 1 may therefore be eliminated by adjusting the second linkage 40 with the means described for varying the length of link 41.

It may also be desirable at times to vary the speed of turbine 1 regardless of the load on turbine 1 or even perhaps when the load has remained constant but for some reason it is desired to vary the speed of the turbine and yet maintain the matched heat output of the reactor 4 to the heat requirements of turbine 1. To do this a second adjusting means is provided to simultaneously adjust the first linkage 10 controlling valve assembly 6 and the second linkage 40 controlling the pressure within reactor 4. To adjust both of these linkages simultaneously and not upset the balance between the two adjustments, the second adjusting means is provided to adjust lever 14. Since lever 14 is common to both the first and second linkages 10 and 40, a single adjustment of this lever will proportionately adjust both the first and second linkages. Lever 14 rotates about a bracket 15. Therefore by adjusting the position of the bracket 15 the lever 14 may be adjusted and both of the linkages operated by lever 14 will be adjusted proportionately. To do this bracket 15 may be mounted on a rod 90 having a threaded portion 91. A gear 92 is mounted for rotation about the threaded portion 91 but secured against axial movement of its own by stop members 93. The gear 92 has a threaded hole passing through its center into which the threaded portion 91 is turned. A second gear 94 engages the first gear 92. A hand wheel 95 or a motor 96 which may be remotely controlled may be provided to turn gear 94. Bracket 15 may therefore be either raised or lowered by turning gear 94 which in turn will turn gear 92 about the threaded portion 91 of rod 90 and depending on the direction of rotation of gear 92 threaded portion 91 of rod 90 will be moved either upwardly or downwardly. Upward or downward movement of bracket 15 will cause lever 14 to be rotated about sliding collar 17. Thus without any change in the speed of turbine 1 by governor action both the first linkage 10 controlling valve assembly 6 and the second linkage 40 controlling the pressure in reactor 4 may be simultaneously adjusted to increase or decrease the speed of turbine 1 without upsetting the balance of heat output by reactor 4 to heat requirements of turbine 1.

From the foregoing it will be apparent to those skilled in the art that the illustrated embodiment of the invention provides a new and improved apparatus for producing power and accordingly accomplishes the objects of the invention. On the other hand it will also be obvious to those skilled in the art that the illustrated embodiment of the invention may be variously changed and modified or features thereof singly or collectively embodied in combinations other than as illustrated without departing from the spirit of the invention or sacrificing all of the advantages thereof and accordingly the disclosure herein is illustrative only and the invention is not limited thereto.

It is claimed and desired to secure by Letters Patent:
1. In a power plant including a steam turbine supplying power to a variable load at a substantially constant predetermined speed, a boiling type reactor for generating steam to operate said turbine and means for conducting steam from said reactor to said turbine, a control system comprising: a first valve assembly for controlling admission of steam to said turbine, a second valve assembly for controlling pressure within said reactor, and a governor responsive to the speed of said turbine, said governor being connected to said first and second valve assemblies, said governor being operative in response to turbine speed greater than said predetermined speed to adjust said first valve assembly to reduce the flow of steam to said turbine and to adjust said second valve assembly to decrease pressure within said reactor to reduce heat output of said reactor, and said governor being vice versa operative in response to turbine speed less than said predetermined speed to adjust said first valve assembly to increase the steam flow to said turbine and to adjust said second valve assembly to increase pressure within said reactor to increase heat output of said reactor to thereby operate said turbine at said predetermined speed and match the heat output of said reactor to the variable heat input requirements of said turbine for variable loads.

2. In a power plant including a steam turbine supplying power to a variable load at substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, and a governor responsive to the speed of said turbine, control means connected to said governor including first and second movable linkages connected to said first and second valve assemblies respectively, said governor being operative in response to turbine speed greater than said predetermined speed to move said first linkage to adjust said first valve assembly to reduce the steam flow to said turbine and move said second linkage to adjust said second valve assembly to decrease pressure within said reactor to reduce heat output of said reactor, and said governor being vice versa operative in response to turbine speed less than said predetermined speed to move said first linkage to adjust said first valve assembly to increase the steam flow to said turbine and move said second linkage to adjust said second valve assembly to increase pressure within said reactor to increase heat output of said reactor to thereby operate said turbine at said predetermined speed and match the heat output of said reactor to the variable heat input requirements of said turbine for variable loads.

3. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, a governor responsive to the speed of said turbine, a fulcrum, a lever moved about said fulcrum by said governor, first and second movable linkages connected to said first and second valve assemblies respectively, said governor being operative in response to turbine speed greater than said predetermined speed to move said first linkage to adjust said first valve assembly to reduce the steam flow to said turbine and move said second linkage to adjust said second valve assembly to decrease pressure within said reactor to reduce heat output of said reactor, and said governor being vice versa operative in response to turbine speed less than said predetermined speed to move said first linkage to adjust said first valve assembly to increase the steam flow to said turbine and move said second linkage to adjust said second valve assembly to increase pressure within said reactor to increase heat output of said reactor to thereby operate said turbine at said predetermined speed and match the heat output of said reactor to the variable heat input requirements of said turbine for variable loads, and means for moving said fulcrum to simultaneously move said first and second linkages for equally changing the matched heat output of said reactor and the heat input to said turbine regardless of the operation of said governor.

4. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, a governor responsive to the speed of said turbine, a fulcrum, a lever moved about said fulcrum by said governor, said first and second movable linkages connected to said first and second valve assemblies respectively, said governor being operative in response to turbine speed greater than said predetermined speed to adjust said first linkage to in turn adjust said first valve assembly to reduce the steam flow to said turbine and said second linkage to in turn adjust said second valve assembly to decrease pressure within said reactor to reduce heat output of said reactor, and said governor being vice versa operative in response to turbine speed less than said predetermined speed to adjust said first linkage to in turn adjust said first valve assembly to increase the steam flow to said turbine and said second linkage to in turn adjust said second valve assembly to increase pressure within said reactor to increase heat output of said reactor, said second linkage including a variable length link and means for varying the length of said link to adjust movement of said second linkage relative to said first linkage to coordinate the aforesaid action of said second valve assembly with the first valve assembly to operate said turbine at said predetermined speed and with the heat output of said reactor being continuously matched to the variable heat input requirements of said turbine for variable loads.

5. In a power plant including a steam turbine supplying power to a variable load at substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, steam exhausting means for intercepting steam flow from said first valve assembly to said second valve assembly, said exhausting means including a third valve assembly for controlling the steam flow therethrough, a governor responsive to the speed of said turbine, said governor being connected to said first, second and third valve assemblies, said governor being operative in response to turbine speed greater than said predetermined speed to adjust said first valve assembly to reduce the steam flow to said turbine and to adjust said second valve assembly to decrease pressure with said reactor to reduce heat output of said reactor and to adjust said third valve assembly for opening thereof to exhaust steam and relieve back pressure on said reactor, and said governor being vice versa operative in response to turbine speed less than said predetermined speed to adjust said first valve assembly to increase the steam flow to said turbine and to adjust said second valve assembly to increase pressure within said reactor to increase heat output of said reactor and to adjust said third valve assembly for closing thereof and operate said turbine at said predetermined speed with the heat output of said reactor matched to the variable heat input requirements of said turbine for variable loads.

6. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, steam exhausting means for intercepting steam flow to said first valve assembly, said exhausting means including a third valve assembly for controlling the steam flow therethrough, a governor responsive to the speed of said turbine, control means connected to said governor including a first and a second and a third movable linkage connected to said first, second and third valve assemblies respectively, said governor being operative in response to turbine speed greater than said predetermined speed to move said first linkage to adjust said first valve assembly to reduce the steam flow to said turbine and move said second linkage to adjust said second valve assembly to decrease pressure within said reactor to reduce heat output of said reactor and to move said third linkage to adjust said third valve assembly for opening thereof to exhaust steam intercepted from said reactor to said first valve assembly and relieve back pressure on said reactor, and said governor being vice versa operative in response to turbine speed less than said predetermined speed to move said first linkage to adjust said first valve assembly to increase the steam flow to said turbine and move said second linkage to adjust said second valve assembly to increase pressure within said reactor to increase heat output of said reactor and to move said third linkage to adjust said third valve assembly for closing thereof to thereby operate said turbine at said predetermined speed and match the heat output of said reactor to the variable heat input requirements of said turbine for variable loads.

7. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, steam exhausting means connected to said conduit means between said first and said second valve assemblies for exhausting steam from said conduit means, said exhausting means including a third valve assembly for controlling the steam flow therethrough, a governor responsive to the speed of said turbine, control means connected to said governor including first, second and third movable linkages connected to said first, second and third valve assemblies, respectively, said governor being operative in response to turbine speed greater than said predetermined speed to move said first linkage to adjust said first valve assembly to reduce the steam flow to said turbine and move said second linkage to adjust said second valve assembly to decrease pressure within said reactor to reduce heat output of said reactor and to move said third linkage to adjust said third valve assembly for opening thereof to exhaust steam from said conduit means and relieve back pressure on said reactor, and said governor being vice versa operative in response to turbine speed less than said predetermined speed to move said first linkage to adjust said first valve assembly to increase the steam flow to said turbine and move said second linkage to adjust said second valve assembly to increase pressure within said reactor to increase heat output of said reactor and to move said third linkage to adjust said third valve assembly for closing thereof, said second and third linkages each including a connection comprising a roller engaging a cam shaped to vary the amount of adjustment transmitted to said second and third valve assemblies necessary to match heat output of said reactor to the variable heat input requirements of said turbine for variable loads.

8. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, a governor responsive to the speed of said turbine, control means connecting said governor to said first and second valve assemblies, said governor being operative in response to turbine speed greater than said predetermined speed to operate said control means to adjust said first valve assembly to reduce the steam flow to said turbine and to adjust said second valve assembly to decrease pressure within said reactor to reduce heat output of said reactor, and said governor being vice versa operative in response to turbine speed less than said predetermined speed to adjust said first valve assembly to increase the steam flow to said turbine and to adjust said second valve assembly to increase pressure within said reactor to increase heat output of said reactor to thereby operate said turbine at said predetermined speed and match the heat output of said reactor to the variable heat input requirements of said turbine for variable loads, and means for adjusting said control means to simultaneously change the matched heat output of said reactor and the heat input to said turbine regardless of the operation of said governor.

9. In a power plant including a steam turbine supplying power to a variable load at a substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, a governor responsive to the speed of said turbine, said governor being connected to said first and second valve assemblies, said governor being operative in response to turbine speed greater than said predetermined speed to adjust said first valve assembly to reduce the steam flow to said turbine and to adjust said second valve assembly to decrease pressure within said reactor to reduce heat output of said reactor, and said governor being vice versa operative in response to turbine speed less than said predetermined speed to adjust said first valve assembly to increase the steam flow to said turbine and to adjust said second valve assembly to increase pressure within said reactor to increase heat output of said reactor, and means for adjusting said second valve assembly independently of said first valve assembly and independent of the action of said governor to adjust the amount of action of said second valve assembly relative to the action of said first valve assembly.

10. In a power plant including a steam turbine supplying power to a variable load at substantially constant predetermined speed, a boiling type reactor for generating steam to operate said turbine, and means for conducting steam from said reactor to said turbine, a control system comprising: a first valve assembly for controlling admission of steam to said turbine, a second valve assembly for controlling pressure within said reactor, a governor responsive to the speed of said turbine, control means connecting said governor to said first and second valve assemblies, said governor being operative in response to turbine speed greater than said predetermined speed to adjust said first valve assembly to reduce the steam flow to said turbine and to adjust said second valve assembly to decrease pressure within said reactor to reduce heat output of said reactor, and said governor being vice versa operative in response to turbine speed less than said predetermined speed to adjust said first valve assembly to increase the steam flow to said turbine and to adjust said second valve assembly to increase pressure within said reactor to increase heat output of said reactor, said control means including a first adjusting means for adjusting the amount of the action of said second valve assembly relative to action of said first valve assembly so the heat output of said reactor matches the variable heat input requirements for all loads on said turbine, and said control means including a second adjusting means for simultaneously changing the matched heat output of said reactor and the heat input to said turbine regardless of governor action.

References Cited in the file of this patent

UNITED STATES PATENTS

| | | |
|---|---|---|
| 2,204,139 | Knowlton | June 11, 1940 |
| 2,520,568 | Sederquist | Aug. 29, 1950 |

OTHER REFERENCES

Nucleonics, July 1954, pages 43–47 (Untermeyer).

"Principles of Nuclear Reactor Engineering," by Samuel Glasstone, D. Van Nostrand Co., New York, 1st edition, 1955, pages 522, 758–761, 819, 820, 318–320, 362, 363.

UNITED STATES PATENT OFFICE
CERTIFICATION OF CORRECTION

Patent No. 2,968,600                      January 17, 1961

Robert C. Allen

It is hereby certified that error appears in the above numbered patent requiring correction and that the said Letters Patent should read as corrected below.

Column 8, line 62, for "with" read -- within --.

Signed and sealed this 6th day of June 1961.

(SEAL)
Attest:

ERNEST W. SWIDER
Attesting Officer

DAVID L. LADD
Commissioner of Patents